United States Patent

Hatanaka et al.

[11] 3,778,595
[45] Dec. 11, 1973

[54] AUTOMATIC TELLER SYSTEM

[75] Inventors: Yoshihiro Hatanaka; Akio Ueba, both of Himeji, Japan

[73] Assignee: Kabushiki Kaisha Kokuei Kikai Seisakusho, Himeji-shi, Hyogo-ken, Japan

[22] Filed: Oct. 15, 1971

[21] Appl. No.: 189,646

[30] Foreign Application Priority Data
Oct. 17, 1970  Japan.............................. 45/91425

[52] U.S. Cl. ...................... 235/61.7 B, 340/149 A
[51] Int. Cl. .............................................. G06r 7/01
[58] Field of Search ................ 340/149 A; 235/61.7 B, 61.9 R, 61.8 R; 194/4 R

[56] References Cited
UNITED STATES PATENTS

| | | | |
|---|---|---|---|
| 3,648,020 | 3/1972 | Tateisi et al. .................... | 340/149 A |
| 3,657,521 | 4/1972 | Constable ........................ | 235/61.7 B |
| 3,487,905 | 1/1970 | James, Sr. ........................ | 235/61.9 R |
| 3,588,449 | 6/1971 | Paterson ......................... | 340/149 A |
| 3,641,315 | 2/1972 | Nagata et al. ................... | 235/61.7 B |

*Primary Examiner*—Thomas A. Robinson
*Attorney*—Holman & Stern

[57] ABSTRACT

An automatic bank teller system comprises means for reading out a depositor's code from a card of a user, means operated by the user for selecting the operation of the system between reception and payment of money, means also operated by the user for designating a sum of money to be received or paid, means for memorizing the bank file of depositors' accounts to send out the depositor's account in correspondence to the read-out code from the card, and means for receiving or paying the desired sum of money upon confirmation of the balance as calculated from the output of said memorizing means and the sum of money to be received by or paid to the user of the teller system.

5 Claims, 2 Drawing Figures

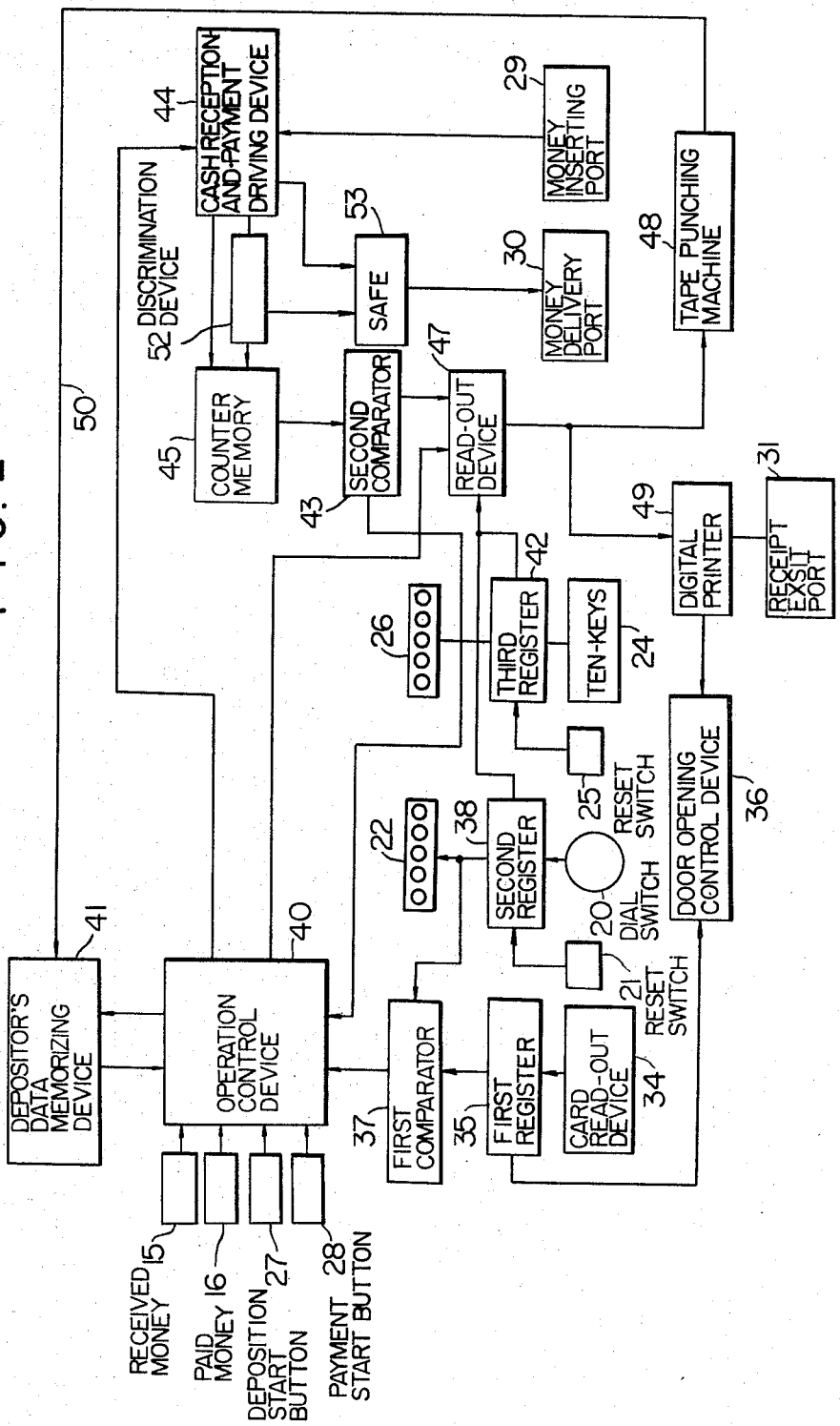

AUTOMATIC TELLER SYSTEM

BACKGROUND OF THE INVENTION

This invention relates to an automatic bank teller system whereby one can automatically deposit cash money in a bank or draw out cash therefrom without any human intervention.

DESCRIPTION OF PRIOR ART

In recent years, information processing techniques have made much progress, rendering great contribution to betterment of money handling facilities. For instance, strenuous efforts have been exercised in most banks to realize an automatic cash reception and payment system for the convenience of customers and for the simplification and speeding-up of the bank business. More specifically, in accordance with such projects, many of the branch offices of a bank are interconnected through an information processing network, whereby a customer may draw out his money or deposit the same at any desired time and at any desired branch office.

However, in the present state of the art, the application of automatic information processing technique has not yet progressed satisfactorily. For instance, in a night-time depository provided in many banks, money can be received even at night-time, but remittance thereof into the bank deposition records must wait until the next morning. Likewise, in another prior art system allowing the customer to draw out his money without the intervention of a teller of the bank, he can draw out only a limited sum of money, and nothing about deposition is considered in this case.

SUMMARY OF THE INVENTION

Therefore, a primary object of the present invention is to provide an automatic teller system whereby cash can be automatically received or paid out without the need for any human intervention.

Another object of the invention is to provide an automatic teller system whereby a customer can draw out or deposit money at any time irrespective of the bank business hours.

Still another object of the invention is to provide an automatic teller system wherein the required time for drawing money or depositing the same is extremely short.

A further object of the invention is to provide an automatic teller system which can be installed at any place distant from the bank, such as an airport, a hotel, or a department store.

These and other objects of the present invention can be achieved by an automatic teller system which comprises means for reading out a depositor's code from a card of a user, means operated by the user for selecting the operation of the system between receiving and paying money, means also operated by the user for designating a sum of money to be received or paid, means for memorizing the bank file of depositor's accounts to send out the depositor's account in correspondence to the read-out code from the card, and means for receiving or paying the desired sum of money upon confirmation of the balance as calculated from the output of said memorizing means and the sum of money to be received by or paid to the user of the teller system.

The nature, principle, and the utility of the present invention will be fully understood from the following detailed description with respect to a preferred embodiment of the invention when read in conjunction with the accompanying drawings.

BRIEF DESCRIPTION OF THE DRAWINGS

In the drawings:

FIG. 2 is a block diagram of an example of a system incorporating the teller unit device shown in FIG. 1.

DETAILED DESCRIPTION OF THE INVENTION

Figure 1:
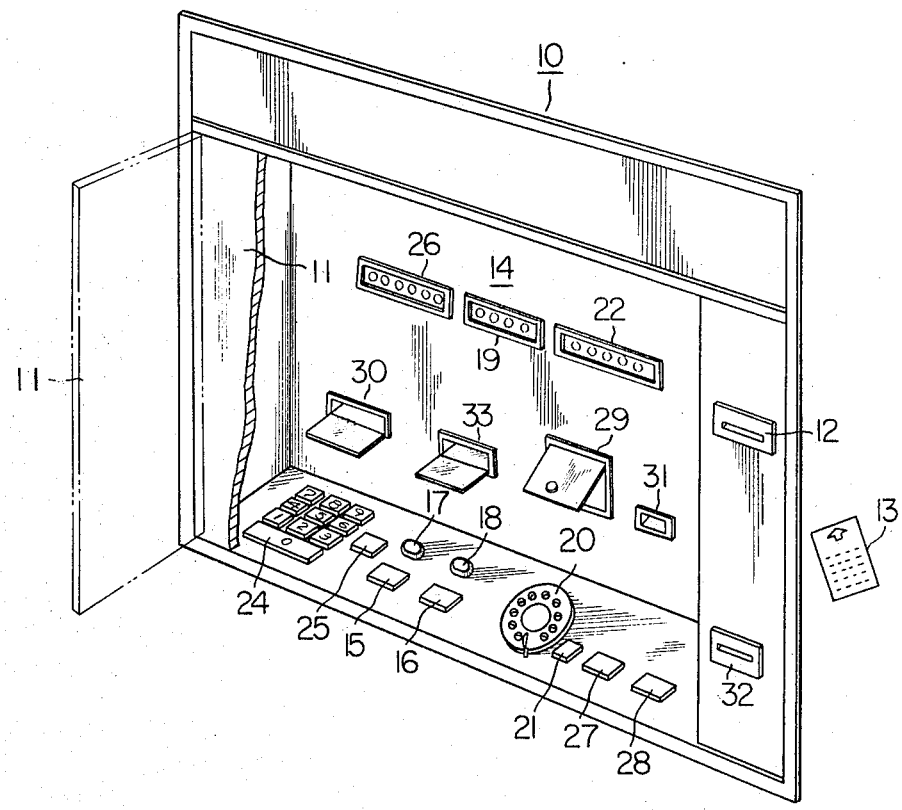
FIG. 1 is a perspective view of an example of an automatic teller unit device constituting a part of a system embodying the present invention.

Referring to FIG. 1, the teller unit device generally designated by reference numeral 10 includes a door 11 which is normally closed. When it is desired to operate the device 10, a card 13 is inserted into a slot 12, when the door 11 is opened by means of, for instance, an electric motor (not shown). Opening of the door 11 exposes a control panel 14 of the device 10, which includes two buttons 15 and 16 for selecting the operation of the teller device 10 between deposition and payment, respectively. Indicator lamps 17 and 18 are provided on the control panel 14 for indicating the thus selected operation of the teller device.

A dial switch 20 provided on the control panel is employed as an input device for a personal code to be compared thereafter with a depositor's code registered in the bank file. The dial switch 20 may be replaced by a set of push button switches. Adjacent to the dial switch 20, a reset switch 21 is provided for resetting the dial switch 20 when it is operated erroneously. The personal code introduced in the dial switch 20 is further indicated in a code-displaying window 22.

A keyboard 24 is also provided on the control panel 14 for selecting and setting the sum of money to be received or paid. As in the case of the dial switch 20, a reset switch 25 and a window 26 for indicating the sum of money are also provided in conjunction with the keyboard 24. A deposition start switch 27 and a paying start switch 28 are further provided on the control panel 14 for starting one of the depositing operation and paying operation, respectively, after the dial switch 20 and the keyboard 24 have been operated.

The control panel 14 further includes a money inserting port 29, a money delivering port 30, a receipt exit port 31 wherefrom a user receives a receipt indicating the balance of his account, and a money returning port 33, from which any excessive amount of money inserted by mistake by the user is returned.

Referring now to the drawings, FIG. 2 shows a block diagram of one example of the automatic teller system according to the present invention, wherein like parts are designated by like reference numerals. The codes borne on the card 13 inserted in the card inserting slot 12 are read out by a card read-out device 34 magnetically or optically, and the signals thus converted from the codes are memorised in a first register 35. When a part of the signals thus memorized in the first register 35 coincides with the predetermined bank code stored beforehand in the register 35, this part of the signals is fed to a door-opening control device 36 and the other part of the signals is fed to a first comparator 37.

The first comparator 37 is in the form of an AND circuit, and the personal code of a user memorized in a second register 38 through the dial switch 20 is supplied to another terminal of the first comparator 37 in the form of an AND circuit. The first comparator 37 compares the signal sent from the first register 35 with the personal code signal sent from the second register 38, and when these two coincide, a signal is sent to a numerical operation or computation control device 40.

The numerical operation control device 40 can be controlled from the control panel 14 shown in FIG. 1. That is, the operation control device 40 is connected with the deposition button 15, payment button 16, deposition start switch 27, and the payment start switch 28.

It should be noted that the first comparator 37 alternatively may be included in the numerical operation control device 40. Whenever the numerical operation control device 40 is of a greatly complicated construction, the first and the second registers 35 and 38 may also be omitted, and the outputs of the card read-out device 34 and the dial switch 20 connected directly to the control device 40. The operation control device 40 is further connected to a depositor's data memorizing device 41 wherein all of the depositor's accounts are filed and stored.

The sum of money to be deposited or drawn out by the user, which is set by the keyboard 24, is memorized in a third register 42. The output of the third register 42 is fed to the numerical operation control device 40, the second comparator 43, and the window 26 for indicating the sum of money. The second comparator 43 in the form of an AND circuit compares the sum of money to be deposited or to be paid with the output of a counter memory 45 which counts the operation of a cash reception-and-payment driving device 44 commanded by the calculated result in the numerical operation control device 40. The second comparator 43 sends out a signal to a read-out device 47 after the comparison of the signal from the third register 42 with the signal from the counter memory 45.

The read-out device 47 reads out the personal code memorized in the second register 38, the nature of the transaction chosen by the user, i.e., deposition or payment of money, and also the account balance of the user both supplied from the numerical operation control device 40, and the sum of money now to be deposited or paid out, which is memorized in the third register 42, and drives a tape punching device 48 which acts to keep a record and a digital printer 49 which prints the receipt as described hereinbefore. The output of the tape punching device 48 is supplied to the depositor's data memorizing device 41 through a line 50, whereupon the account of the user is revised in the device 41.

The digital printer 49, on the other hand, prints a receipt, which is thereafter delivered through the receipt exit port 31. After the operation of the digital printer 49, a signal for closing the door 11 is issued therefrom with a predetermined time delay.

The cash reception-and-payment driving device 44, in the depositing operation, classifies the paper notes or bills and coins inserted through the money inserting port 29 in a known manner. More specifically, the paper notes are drawn sheet by sheet by a vacuum head (not shown) and sent to a cash discriminating device 52, which detects the configuration, pattern, magnetic features, etc., of the paper notes and counts the number, and the paper notes determined to be good are received in a safe 53.

On the other hand, the coins are sent to a coin selecting section (not shown) of the cash discriminating device 52, and the configurations (diameters, thicknesses, weights, etc.) thereof are examined, and the number thereof is counted. Coins passing the examination are also received in the safe 53. During the above described operation, if counterfeit paper notes or coins are found, or if the user has erroneously placed too much money in the money inserting port 29, the cash discriminating device 52 will detect these counterfeits or excessive amount of money, and these are returned from the money delivering port 30.

In the paying operation, the cash reception-and-payment driving device 44 causes the count memory 45 to count the required paper notes and coins in the safe 53, and the thus counted money is delivered through the money delivering port 30.

The above described operation of the teller system according to the present invention is summarized below with respect to a money depositing operation. First the user inserts his personal card 13 into the card inserting slot 12, whereupon the personal code borne on the card 13 is read out by the card read-out device 34, and the thus obtained data is memorized in the first register 35. When the data obtained from the card 13 coincides with a code memorized in the first register 35, the first register sends out a signal to the door operation control device 36, and the door 11 is opened as shown by chain lines. Simultaneously, a signal is supplied to the first comparator 37.

The user thereafter supplies his personal code number through the dial switch 20. This input is memorized in the second register 38, and the output from the second register 38 is fed to the first comparator to be compared therein with the output from the first register 35. When these two coincide, the first comparator 37 sends out a signal to the numerical operation control device 40, and in the numerical operation control device, data for the user's account is addressed. Thereupon the code number dialed in the dial switch 20 is also indicated in the indicating window 22.

The user thereafter pushes the depositing button 15, and then the sum of money to be deposited is set by means of the keyboard 24. The sum of money thus selected by depressing the keys is indicated in the window 26, and a corresponding signal is sent to the numerical operation control device 40. Accordingly when the user places his money into the cash inserting port 29 and pushes the deposition start switch 27, the paper notes and coins are successively counted by the cash reception-and-payment driving device 44 to be memorized in the counter memory 45. The cash at this time is received in the safe 53. However, if any counterfeit money is found within the thus deposited money, such counterfeits will be rejected and returned through the money returning port 33.

The sum of money memorized in the counter memory 45 is supplied to the second comparator 43. Since the sum of money to be deposited has been indicated to the second comparator 43 from the keyboard 24, the thus compared data in the second comparator 43 is supplied to the read-out device 47. The read-out device 47 receives signals representing the account of the user and from the fact that a new deposition is now made by the user from the numerical operation control device 40, and another signal representing the sum of money deposited from the second register 42, and commands the tape punching machine 48 to record these data and the digital printer 49 to print a receipt (not shown).

The receipt is then delivered to the user through the receipt exit port 31, and the record punched by the tape punching machine 48 is supplied to the depositor's data memorizing device 41 through the line 50. The memorizing device 41 now revises the user's account in its file.

After a predetermined time log from the operation of the digital printer 49, the door 11 is closed, and the card 13 is returned from the card returning port 32.

The operation of the above described automatic teller system, differs from the above described operation in case of a payment in that the payment button 16 and payment start switch 28 are operated respectively instead of the deposit button 15 and the deposit start switch 37. Upon depression of the payment start switch 28, the numerical operation control device 40 confirms the balance of money from the user's account, in the depositor's data memorizing device 41. Furthermore, the numerical operation control device 40 compares the balance of the user with the sum of money desired to be paid which is supplied from the third register 42, and when the payment is to be allowed, the device 40 commands the cash receiving-and-paying device 44 to operate so that the cash is paid through the money delivering port 30. However, when the balance of the user is not sufficient to cover the required payment, an indicating window 19 indicates the deficient amount at the same time withholding payment.

We claim:

1. An automatic deposit-receiving and cash-dispensing system in a bank or the like, comprising:
    data reading means for reading out a depositor's code from an identification card of a user of the system;
    selecting means operated by the user for selectively producing a command signal corresponding to either a selection of cash deposition or withdrawal respectively;
    indicating means for indicating an amount of money to be deposited or withdrawn;
    memory means having the user's account data memorized therein and adapted to send out data read from said identification card and related to the user's account;
    a cash depositing and withdrawal device for carrying out the money deposition or withdrawal after the selection operation of said selecting means and indication of an amount of money in said indicating means have been completed;
    a comparison circuit means for comparing the amount of money indicated by said indicating means with the money amount which is deposited or withdrawn by said cash depositing and paying device and producing a coincidence signal when the two amounts are equal;
    and data renewing means controlled by said coincident signal produced by said comparison circuit means so as to revise the user's account memorized in said memory means.

2. An automatic deposit-receiving and cash-dispensing system, as claimed in claim 1, in which there is further provided recording means for recording various data relating to deposition or withdrawal which is provided as a receipt for the user, said recording means being controlled by said coincident signal of said comparison circuit means.

3. An automatic deposit-receiving and cash-dispensing system, as claimed in claim 1, in which said indicating means comprises a first indicating element for indicating the amount of money to be deposited and a second indicating element for indicating the amount of money to be withdrawn; said cash depositing and withdrawal device comprises cash depositing means for carrying out cash deposition and cash withdrawal means for carrying out cash withdrawal, said indicating means and said cash depositing and withdrawal device being so correlated with said selecting means and said memory means so that said cash depositing means is operated after the selection of cash deposition by said selecting means and indication of the amount of money deposited by said first indicating element have been completed, and when the selection of the dispensing operation by said selecting means and indication of the amount of money dispensed by said second indicating element are achieved, said cash withdrawal or dispensing means is operated in response to a corresponding relation between the memorized content relating to the amount of money in the user's account memorized by said memory means and relating to said depositor's code and the indication signal relating to said dispensing or withdrawn amount of money, and said comparison circuit means is used for comparing the amount of money indicated by said first indicating element with the amount of money deposited by said cash depositing means and comparing the amount of money indicated by said second indicating element with the amount of money to be withdrawn by means of said cash dispensing means.

4. An automatic deposit-receiving and cash-dispensing system as claimed in claim 1, in which said selecting means includes a keyboard having keys which may be depressed so as to correspond to a selected amount of money and to produce said command signal.

5. An automatic deposit-receiving and cash-dispensing system as claimed in claim 1, wherein said memory means further includes indication-signal controlling means for controlling the indication-signal produced by said indicating means.

* * * * *